United States Patent [19]

Hosoi et al.

[11] Patent Number: 4,880,987
[45] Date of Patent: Nov. 14, 1989

[54] RADIATION IMAGE READ-OUT APPARATUS

[75] Inventors: Yuichi Hosoi; Kenji Takahashi, both of Kanagawa, Japan

[73] Assignee: Fuji Photo Film Co., Ltd., Kanagawa, Japan

[21] Appl. No.: 222,299

[22] Filed: Jul. 22, 1988

Related U.S. Application Data

[63] Continuation of Ser. No. 727,988, Apr. 29, 1985, abandoned.

[30] Foreign Application Priority Data

Apr. 27, 1984 [JP] Japan ................................. 59-85722

[51] Int. Cl.4 ............................................. G01T 1/20
[52] U.S. Cl. .............................. 250/484.1; 250/487.1; 250/327.2
[58] Field of Search .................. 250/327.2, 484.1, 372, 250/482.1, 483.1, 372.2 R, 327.2 B, 327.2 C, 327.2 D, 327.2 E, 327.2 F, 487.1, 484.1 R

[56] References Cited

U.S. PATENT DOCUMENTS

| | | | |
|---|---|---|---|
| 4,179,100 | 12/1979 | Sashin et al. | 250/366 |
| 4,272,679 | 6/1981 | Blades | 250/372 |
| 4,400,619 | 8/1983 | Kotera et al. | 250/484.1 |
| 4,507,563 | 3/1985 | Maeoka et al. | 250/483.1 |

FOREIGN PATENT DOCUMENTS 0123942 11/1984 European Pat. Off. ......... 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image read-out apparatus comprises a stimulating ray source for emitting stimulating rays to a stimulable phosphor sheet carrying a radiation image stored therein, a photodetector comprising a photoelectric conversion device, a wavelength converting phosphor positioned between the photodetector and the stimulable phosphor sheet, and a read-out device for detecting the output of the photodetector. The wavelength converting phosphor emits fluorescent light mainly of a wavelength distribution within a sensitive wavelength range of the photodetector upon reception of light emitted by the stimulable phosphor sheet when it is exposed to stimulating rays.

5 Claims, 2 Drawing Sheets

RADIATION IMAGE READ-OUT APPARATUS

This is a continuation of application Ser. No. 06/727,988, filed Apr. 29, 1985, now abandoned

BACKGROUND OF THE INVENTION

1. Field of the Invention

This invention relates to a radiation image read-out apparatus for exposing a stimulable phosphor carrying a radiation image stored therein to stimulating rays which cause the stimulable phosphor to emit light in proportion to the stored radiation energy, and detecting the emitted light for obtaining an image signal. This invention particularly relates to a radiation image read-out apparatus for conducting image read-out by a photodetector using a photoelectric conversion device fabricated of Si or the like.

2. Description of the Prior Art

A novel radiation image recording and reproducing system is disclosed, for example, in U.S. Pat. No. 3,859,527. The system comprises (i) exposing a stimulable phosphor sheet to a radiation passing through an object such as the human body to have a radiation image stored therein, (ii) scanning the stimulable phosphor sheet by stimulating rays which cause it to emit light in proportion to the radiation energy stored, (iii) detecting the emitted light and converting it into an electric image signal by use of a photodetector, and (iv) reproducing a visible image by use of the electric image signal.

In the aforesaid radiation image recording and reproducing system, during image read-out, a semi-transparent mirror is positioned at an angle of 45° with respect to the stimulable phosphor sheet, and stimulating rays are made to pass through the semi-transparent mirror from the back thereof and to impinge upon the stimulable phosphor sheet. Light emitted by the stimulable phosphor sheet in proportion to the stored radiation energy when it is exposed to stimulating rays is reflected approximately normal to the optical path of the stimulating rays by the semi-transparent mirror and is received by an image intensifier tube or a photomultiplier. Alternatively, stimulating rays are emitted from the rear surface of the stimulable phosphor sheet via an aperture, and light emitted by the front surface of the stimulable phosphor sheet is laterally reflected by a prism and received by an image intensifier tube. However, since the semi-transparent mirror or the prism is positioned in far spaced relation to the stimulable phosphor sheet, it is not always possible to efficiently guide the light emitted by the stimulable phosphor sheet, which is non-directional and weak.

Also, it has been proposed in U.S. Pat. No. 4,302,671 to position a photodetector close to a stimulable phosphor sheet, and to position a small reflecting optical element between the photodetector and the stimulable phosphor sheet so that stimulating rays passing through the space between the photodetector and the stimulable phosphor sheet are reflected by the reflecting optical element and made to impinge upon the stimulable phosphor sheet. In this technique, since the light receiving solid angle of the photodetector can be made large, it is possible to improve the signal-to-noise ratio. However, it is necessary to use a complicated, precise optical device for guiding the stimulating rays through the space between the stimulable phosphor sheet and the photodetector to the small reflecting optical element.

In order to eliminate the aforesaid problems of the conventional techniques, a photodetector comprising many photoelectric conversion devices fabricated of Si or the like, for example, a line sensor or a matrix type sensor standing face to face with the whole surface of the stimulable phosphor sheet, may be positioned close to the surface of the stimulable phosphor sheet, and the output of the photodetector may be detected by an image read-out means. In this case, it becomes possible to efficiently detect weak light emitted by the stimulable phosphor sheet, to shorten the read-out time, and to make the read-out apparatus small.

However, the aforesaid photoelectric conversion devices exhibit sensitivity only to a specific wavelength range. Therefore, when the major wavelength distribution of the light emitted by the stimulable phosphor sheet is outside of the sensitive wavelength range of the photoelectric conversion devices, the sensitivity of the photodetector becomes insufficient. For example, BaFBr:Eu, BaClBr:Eu, or the like is preferably used as the stimulable phosphor, and Si devices exhibiting small dark current, high quantum efficiency and easy to fabricate are generally used as the photoelectric conversion devices of the photodetector. The wavelength distribution of the light emitted by the preferable stimulable phosphor such as BaFBr:Eu or BaClBr:Eu is mainly from 350 nm to 420 nm, and the major sensitive wavelength range of the Si elements is higher than 440 nm. Therefore, in this case, the photodetector cannot sufficiently detect the light emitted by the stimulable phosphor.

SUMMARY OF THE INVENTION

The primary object of the present invention is to provide a radiation image read-out apparatus which conducts image read-out by sufficiently securing the sensitivity of a photodetector even when the wavelength distribution of the light emitted by a stimulable phosphor sheet is different from the sensitive wavelength range of photoelectric conversion devices of the photodetector.

Another object of the present invention is to provide a radiation image read-out apparatus wherein various photoelectric conversion devices may be used as the photodetector for a wide variety of stimulable phosphors.

The present invention provides a radiation image read-out apparatus comprising:

(i) a stimulating ray source for emitting stimulating rays to a stimulable phosphor sheet carrying a radiation image stored therein, (ii) a photodetector comprising a photoelectric conversion device and positioned to stand face to face with a portion of said stimulable phosphor sheet exposed to said stimulating rays emitted by said stimulating ray source, (iii) a wavelength converting phosphor positioned between said photodetector and a stimulable phosphor of said stimulable phosphor sheet, said wavelength converting phosphor emitting fluorescent light mainly of a wavelength distribution within a sensitive wavelength range of said photodetector upon reception of light emitted by said stimulable phosphor sheet in proportion to the stored radiation energy when said stimulable phosphor sheet is exposed to said stimulating rays, said fluorescent light impinging upon said photodetector, and (iv) a read-out means for reading out the output of said photodetector.

In the present invention, it is possible to read out a radiation image stored in the stimulable phosphor sheet at sufficiently high sensitivity even when the spectrum of the light emitted by the stimulable phosphor sheet is different from the sensitive wavelength range of the photoelectric conversion devices. Accordingly, it becomes possible to use various photoelectric conversion devices as the photodetector regardless of the sensitive wavelength ranges of the photoelectric conversion devices when a wide variety of stimulable phosphors are used to constitute the stimulable phosphor sheet. As a result, it is possible to design the photodetector as desired to improve the photoelectric conversion efficiency, fabrication easiness, economics, and the like.

The "stimulable phosphor" referred to in this invention means a phosphor which is able to store radiation energy therein upon exposure to a radiation such as X-rays, $\alpha$-rays, $\beta$-rays, $\gamma$-rays, cathode rays or ultraviolet rays, and then emit light in proportion to the stored energy of the radiation upon stimulation with stimulating rays such as visible light.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a > 5 \times 10^{-2}$. Another example of this phosphor is, as shown in U.S. Pat. No. 4,239,968, a phosphor represented by the formula $(Ba_{1-x},M^{II}x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaO \cdot xAl_2O_3$:Eu wherein $0.8 \leq x \leq 10$; and $M^{II}O \cdot xSiO_{/2}$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Also, as the stimulable phosphor can be used $M^{II}X_2 \cdot aM^{II}X'_2$:xEu$^{2+}$ wherein $M^{II}$ is at least one alkaline earth metal selected from the group consisting of Ba, Sr and Ca, each of X and X' is at least one halogen selected from the group consisting of Cl, Br and I, $X \neq X'$, a is a number satisfying $0.1 \leq a \leq 10.0$, and x is a number satisfying $0 < x \leq 0.2$, as described in Japanese Patent Application No. 58(1983)-193161. Among the above enumerated phosphors, the rare earth activated alkaline earth metal halide phosphor is the most preferable, among which the bivalent europium activated alkaline earth metal halide phosphor is the most preferable.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No. 4,346,295.

As the photoelectric conversion device, it is possible to use any known devices, preferably, those obtained by fabricating crystal silicon, amorphous silicon ($\alpha$Si:H), CdS:CdSe or the like into the form of photodiodes, charge coupled devices (CCD) or metal oxide semiconductors (MOS).

As the wavelength converting phosphor, it is possible to use any phosphor insofar as it converts the light emitted by the stimulable phosphor sheet into light mainly having a wavelength distribution within the sensitive wavelength range of the photoelectric conversion devices of the photodetector. For example, when BaFBr:Eu or BaFCl:Eu is selected as the stimulable phosphor and photoelectric conversion devices fabricated of crystal silicon or amorphous silicon ($\alpha$-Si:H) are used, it is possible to use as the wavelength converting phosphor ZnS:Cu, naphthacene, rubrene, Rhodamine 6G, $\beta$-form perylene, fluorescein, para-terphenyl, or the like. It is also possible to use aminocoumarin-based 7-monoethylamino-4-methylcoumarin or aminocoumarin-based 3-phenyl-7-aminocoumarin as disclosed in Japanese Patent Publication No. 54(1979)-4234.

DESCRIPTION OF THE PREFERRED EMBODIMENTS

The present invention will hereinbelow be described in further detail with reference to the accompanying drawings.

Figure 1:
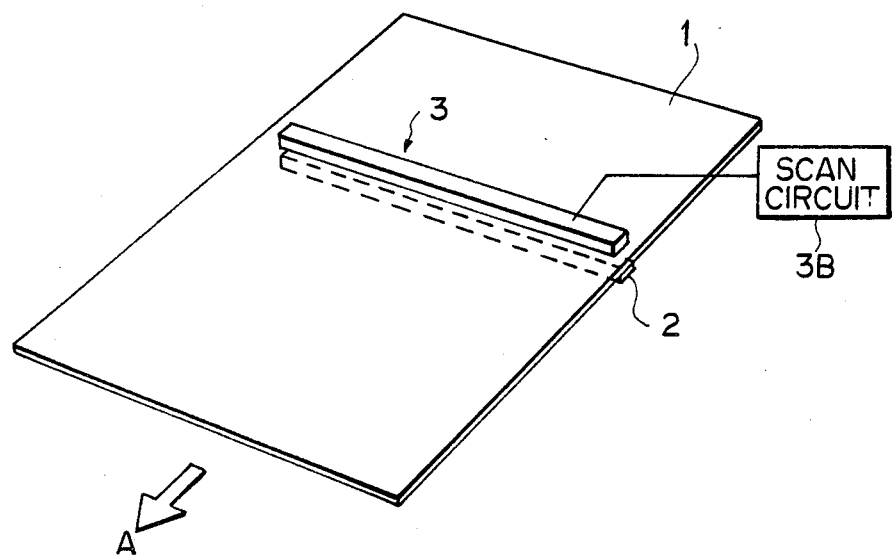
FIGS. 1, 2 and 3 are a perspective view, a sectional front view and a sectional side view showing the image read-out section of an embodiment of the radiation image read-out apparatus in accordance with the present invention.
Figure 2:
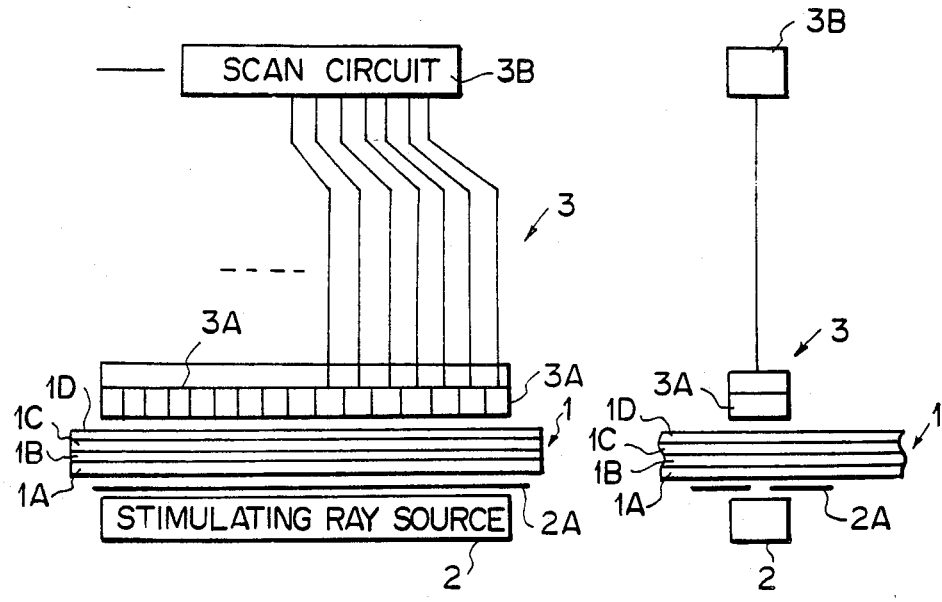
Figure 3:
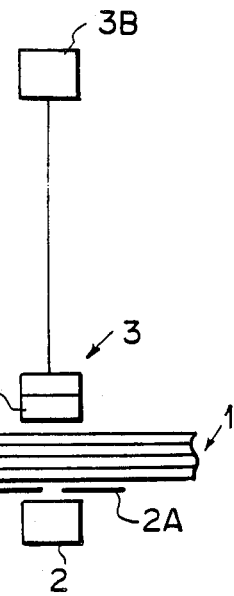

FIGS. 1, 2 and 3 show an embodiment of the radiation image read-out apparatus in accordance with the present invention wherein a line sensor is used as the photodetector. FIG. 1 shows the relationship among the positions of a stimulating ray source 2, a stimulable phosphor sheet 1 and a line sensor 3. FIGS. 2 and 3 are a sectional front view and a sectional side view of FIG. 1.

As shown in detail in FIGS. 2 and 3, the stimulating ray source 2 extending in the width direction of the stimulable phosphor sheet 1 is positioned under the stimulable phosphor sheet 1, and a slit member 2A having an elongated slit extending in the width direction of the stimulable phosphor sheet 1 is positioned between the stimulating ray source 2 and the stimulable phosphor sheet 1. The line sensor 3 is positioned above the stimulable phosphor sheet 1 so as to stand face to face with the slit in the slit member 2A. The line sensor 3 comprises "n" number of solid state photoelectric conversion devices 3A arrayed in the width direction of the stimulable phosphor sheet 1, and a scanning circuit 3B for transferring the charges accumulated in the solid state photoelectric conversion devices 3A.

The stimulable phosphor sheet 1 comprises a transparent substrate 1A positioned on the stimulating ray source 2 side, and a stimulable phosphor layer 1B fabricated of BaFBr:Eu, a long wave cut-off filter layer 1C, and a wavelength converting phosphor layer 1D fabricated of ZnS:Cu which are overlaid in this order on the transparent substrate 1A. The stimulable phosphor sheet 1 is exposed to a radiation in a radiation image recording apparatus (not shown) so that the radiation first impinges upon the wavelength converting phosphor layer 1D, and a radiation image of an object is stored in the stimulable phosphor layer 1B.

The stimulating ray source 2 linearly emits stimulating rays onto the stimulable phosphor sheet 1 via the slit member 2A. The portion of the stimulable phosphor sheet 1 thus exposed linearly to stimulating rays emits light in proportion to the radiation energy stored therein. The emitted light mainly exhibits a 390 nm spectrum inherent to BaFBr:Eu, and impinges upon the wavelength converting phosphor layer 1D after the long wave component is cut off by the filter layer 1C 1C. The wavelength converting phosphor layer 1D receives the light having the wavelength of 390 nm and emits fluorescent light mainly exhibiting a 550 nm spectrum inherent to ZnS:Cu. Since the intensity of the fluorescent light corresponds to the intensity of the light emitted by the stimulable phosphor sheet 1, the fluorescent light carries the radiation image stored in the stimulable phosphor sheet 1. The fluorescent light is simultaneously received by the solid state photoelectric conversion devices 3A of the line sensor 3. Thus the devices 3A generate photocarriers and temporarily store signals obtained thereby. The stored signals are sequentially read out by the scanning circuit 3B, and read-out of one linear exposed portion (corresponding to one scanning line) of the stimulable phosphor sheet 1 is finished.

Then, the stimulable phosphor sheet 1 is moved with respect to the stimulating ray source 2 and the line sensor 3 by a distance equal to the spacing of one scanning line in the direction as indicated by the arrow A, and the aforesaid read-out step is repeated. The read-out operation is repeated over the whole surface of the stimulable phosphor sheet 1, and the radiation image stored in the whole surface of the sheet 1 is read out.

Figure 4:
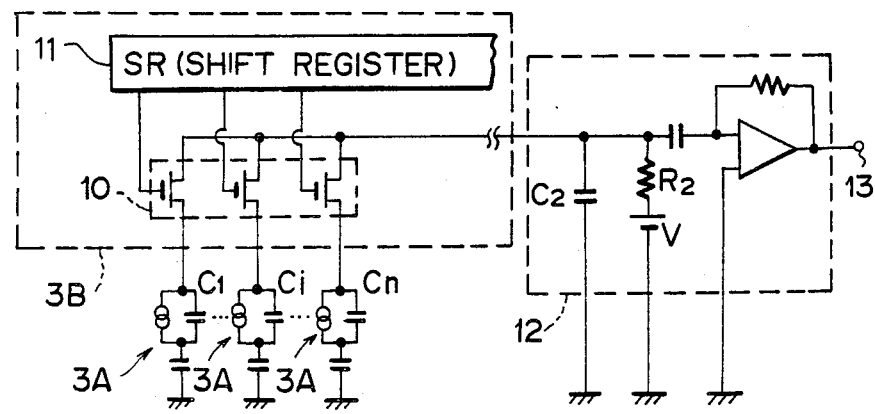
FIG. 4 is a schematic view showing an equivalent circuit of the scanning circuit in the embodiment of FIG. 1.

The scanning circuit 3B following the line sensor 3 will be described hereinbelow. FIG. 4 is an equivalent circuit diagram showing the line sensor using photoconductors and the scanning circuit 3B. Signals caused by photocarriers generated when the fluorescent light impinges upon the solid state photoelectric conversion devices 3A using photoconductors are accumulated at capacitors Ci (where i=1, 2, ..., n) of the solid state photoelectric conversion devices 3A. The accumulated signals of the photocarriers are sequentially read out by switching of a switch section 10 carried out by a shift register 11, and time-serial image signals are obtained thereby. The image signals are then amplified by an amplifier 12 and are sent out from an output terminal 13 of the amplifier 12.

The MOS section comprising the switch section 10 and the shift register 11 may be replaced by a CCD.

The solid state photoelectric conversion devices 3A fabricated of Si mainly exhibit the sensitive wavelength range above 440 nm inherent to Si. When the light having the wavelength of 390 nm emitted by the stimulable phosphor sheet 1 is directly detected, the solid state photoelectric conversion devices 3A cannot exhibit sufficient sensitivity to the light. However, since the solid state photoelectric conversion devices 3A detect the fluorescent light having the wavelength of 550 nm converted from the light emitted by the stimulable phosphor sheet 1, they can detect the radiation image stored in the stimulable phosphor layer 1B at sufficiently high sensitivity.

Figure 5:
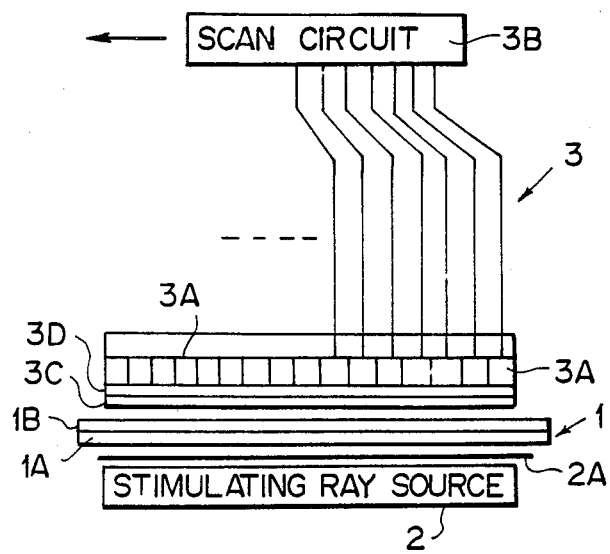
FIG. 5 is a sectional front view showing the image read-out section of another embodiment of the radiation image read-out apparatus in accordance with the present invention.

FIG. 5 shows a part of another embodiment of the radiation image read-out apparatus. In this embodiment, a wavelength converting phosphor layer 3D and a long wave cut-off filter layer 3C are positioned on the light receiving face of the line sensor 3. The line sensor 3 detects the radiation image from the stimulable phosphor sheet 1 comprising the transparent substrate 1A 1A and the stimulable phosphor layer 1B. In this case, too, the light emitted by the stimulable phosphor layer 1B impinges upon the wavelength converting phosphor layer 3D which converts the light into fluorescent light having a wavelength longer than that of the light emitted by the stimulable phosphor sheet 1. Therefore, the fluorescent light is detected by the solid state photoelectric conversion devices 3A at sufficiently high sensitivity.

When the wavelength converting phosphor layer 3D is secured to the photodetector, the amounts of the wavelength converting phosphor and the long wave cut-off filter material used become small. Therefore, the embodiment of FIG. 5 is advantageous from the viewpoint of economics.

It should be understood that the present invention can be embodied in various ways other than the above described embodiments. For instance, the line sensor used as the photodetector in the aforesaid embodiments may be replaced by a matrix type photodetector positioned to stand face to face with the whole surface of the stimulable phosphor sheet, or a spot light detecting type photodetector moveable to follow up stimulating ray scanning points along the surface of the stimulable phosphor sheet scanned by a stimulating ray beam. Also, though the stimulating ray source is positioned on the side of the stimulable phosphor sheet opposite to the photodetector in the aforesaid embodiments, the stimulating ray source may be positioned on the photodetector side of the stimulable phosphor sheet. Further, the long wave cut-off filter may be omitted, depending on the sensitive wavelength range of the photoelectric conversion devices.

We claim:

1. A radiation image read-out apparatus comprising:
   (i) an elongated stimulating ray source (2) for linearly emitting stimulating rays to a stimulable phosphor sheet (1) carrying a radiation image stored therein.
   (ii) an elongate photodetector comprising a photoelectric conversion device (3A) axially aligned with and separate from said stimulating ray source and positioned to stand face to face with a portion of said stimulable phosphor sheet exposed to said stimulating rays emitted by said stimulating ray source, said photoelectric conversion device comprising a line sensor (3).
   (iii) a wavelength converting phosphor layer (1D) positioned between said line sensor and a stimulable phosphor layer (1B) of said stimulable phosphor sheet, said wavelength converting phosphor layer emitting fluorescent light having a wavelength distribution within a sensitive wavelength range of said line sensor upon reception of light emitted by said stimulable phosphor sheet in proportion to the stored radiation energy when said stimulable phosphor sheet is exposed to said stimulating rays, said fluorescent light impinging upon said line sensor.

(iv) a long wave cut-off filter layer (IC), disposed between said stimulating ray source and said wavelength converting phosphor layer, for enabling read-out of radiation stored in said stimulable phosphor sheet, and (v) a read-out means (3B) for reading out the output of said line sensor in a line by line manner.

2. An apparatus as defined in claim 1 wherein said photoelectric conversion device is fabricated of Si, said stimulable phosphor sheet is provided with a bivalent europium activated alkaline earth metal halide phosphor, and said wavelength converting phosphor layer emits fluorescent light mainly having a wavelength of 440 nm or more upon reception of light emitted by said stimulable phosphor sheet.

3. An apparatus as defined in claim 1 or 2 wherein said line sensor comprises a plurality of photoelectric conversion devices, and said apparatus is provided with a means for moving said stimulable phosphor sheet with respect to said line sensor normal to the longitudinal direction of said line sensor.

4. An apparatus as defined in claim 1 wherein said wavelength converting phosphor layer is overlaid on said stimulable phosphor of said stimulable phosphor sheet via said long wave cut-off filter layer.

5. An apparatus as defined in claim 1 wherein said wavelength converting phosphor and a long wave cut-off filter are overlaid in this order on a light receiving face of said photodetector.

* * * * *